Jan. 5, 1937. N. BEL GEDDES 2,066,776
ROTARY PORT FOR AIRCRAFT
Filed June 5, 1934  4 Sheets-Sheet 1
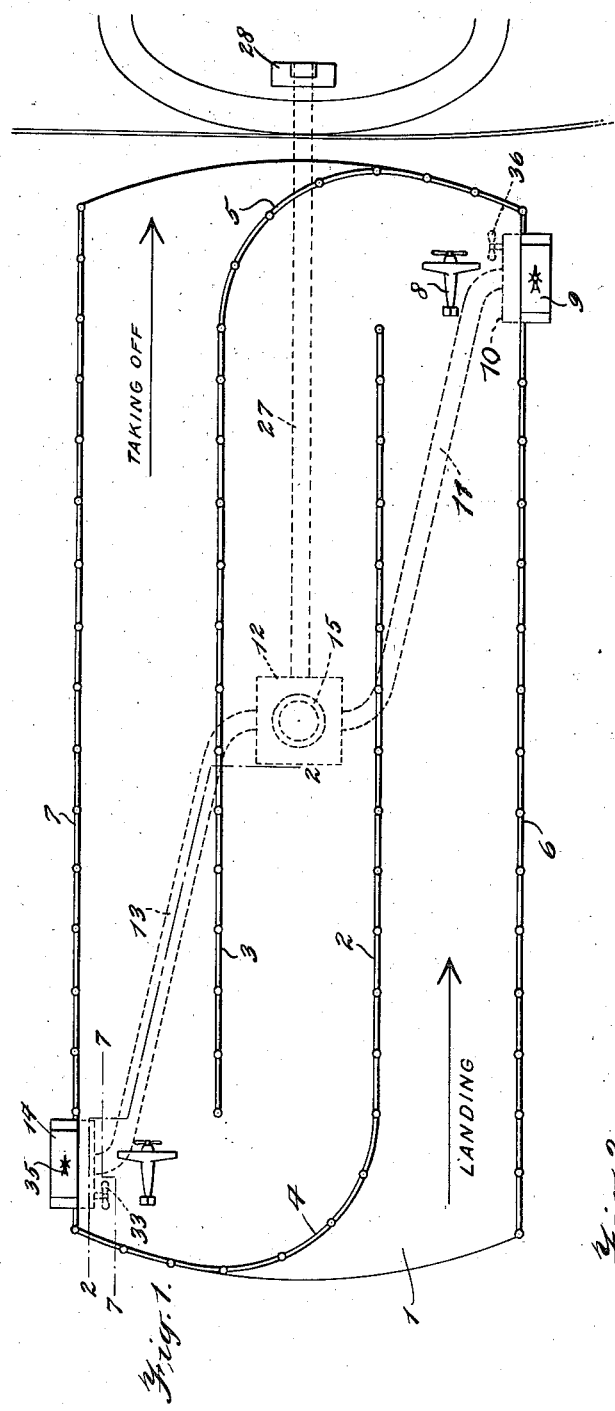
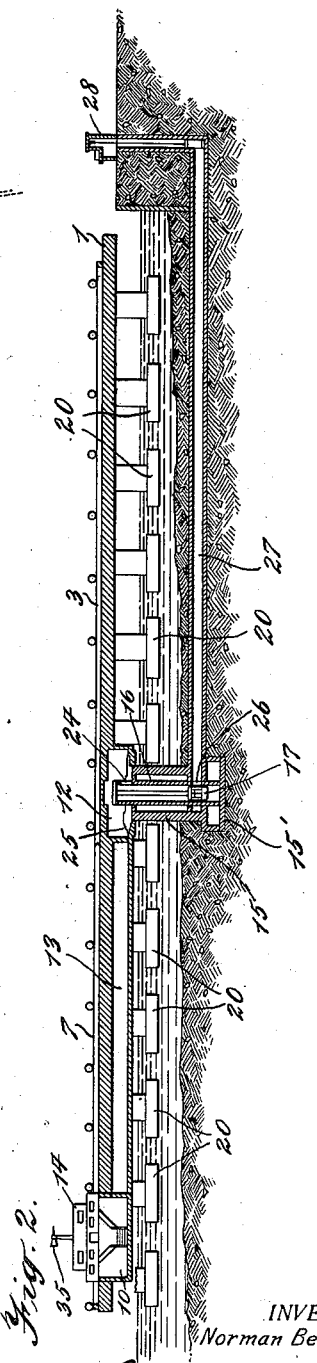
INVENTOR.
Norman Bel Geddes
BY Sheffield & Betts
HIS ATTORNEYS.

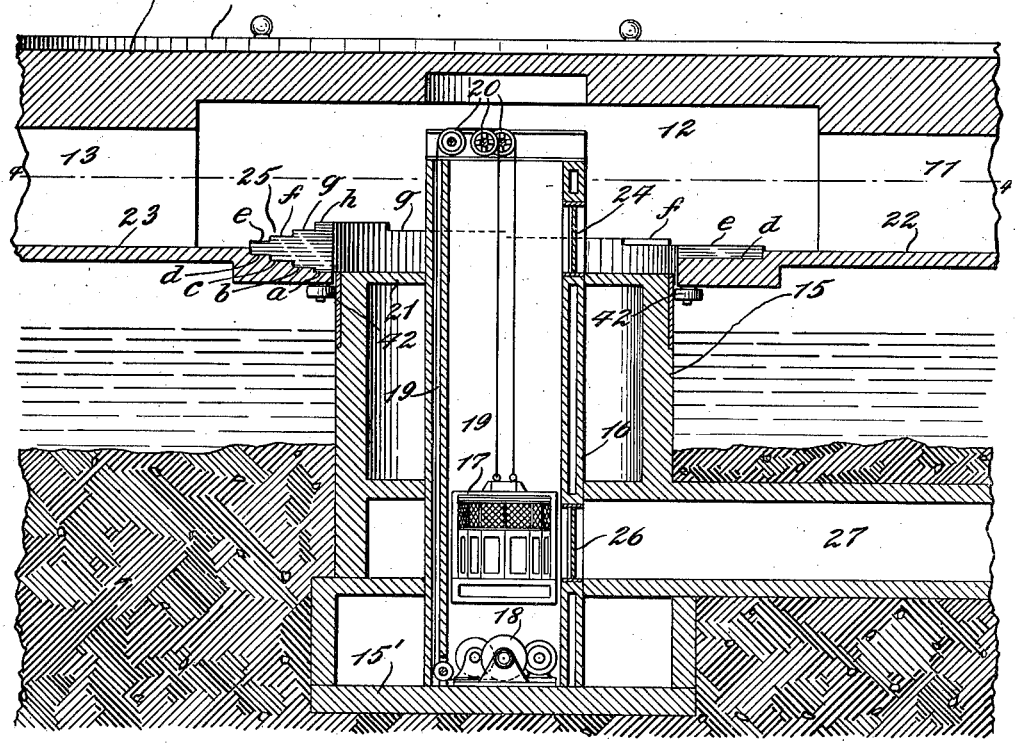
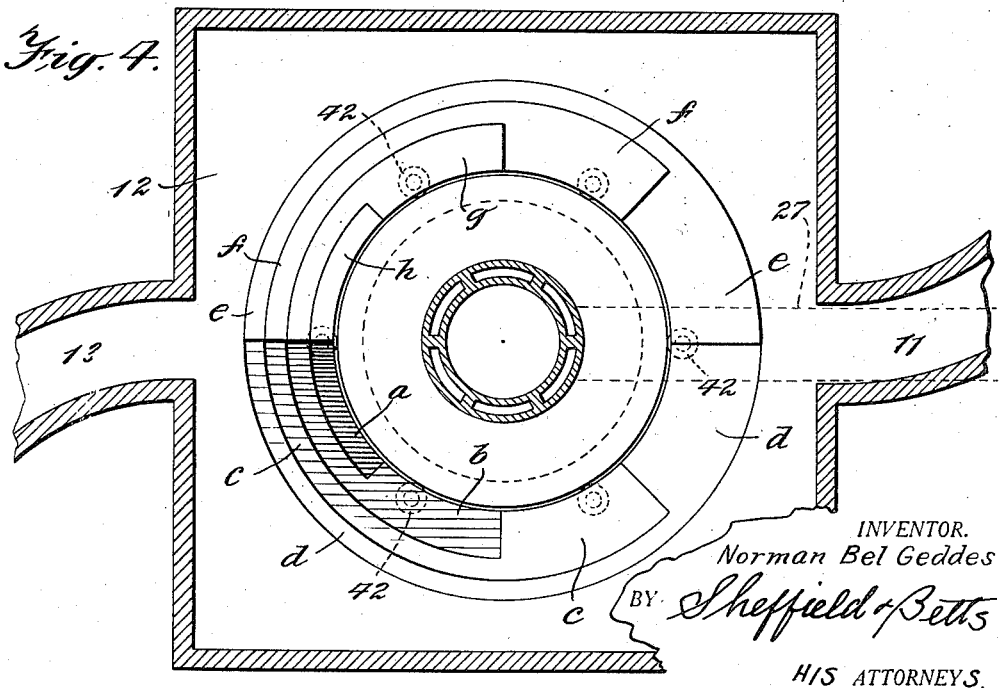

Jan. 5, 1937.  N. BEL GEDDES  2,066,776
ROTARY PORT FOR AIRCRAFT
Filed June 5, 1934  4 Sheets-Sheet 3

INVENTOR.
Norman Bel Geddes
BY *Sheffield & Betts*
HIS ATTORNEYS.

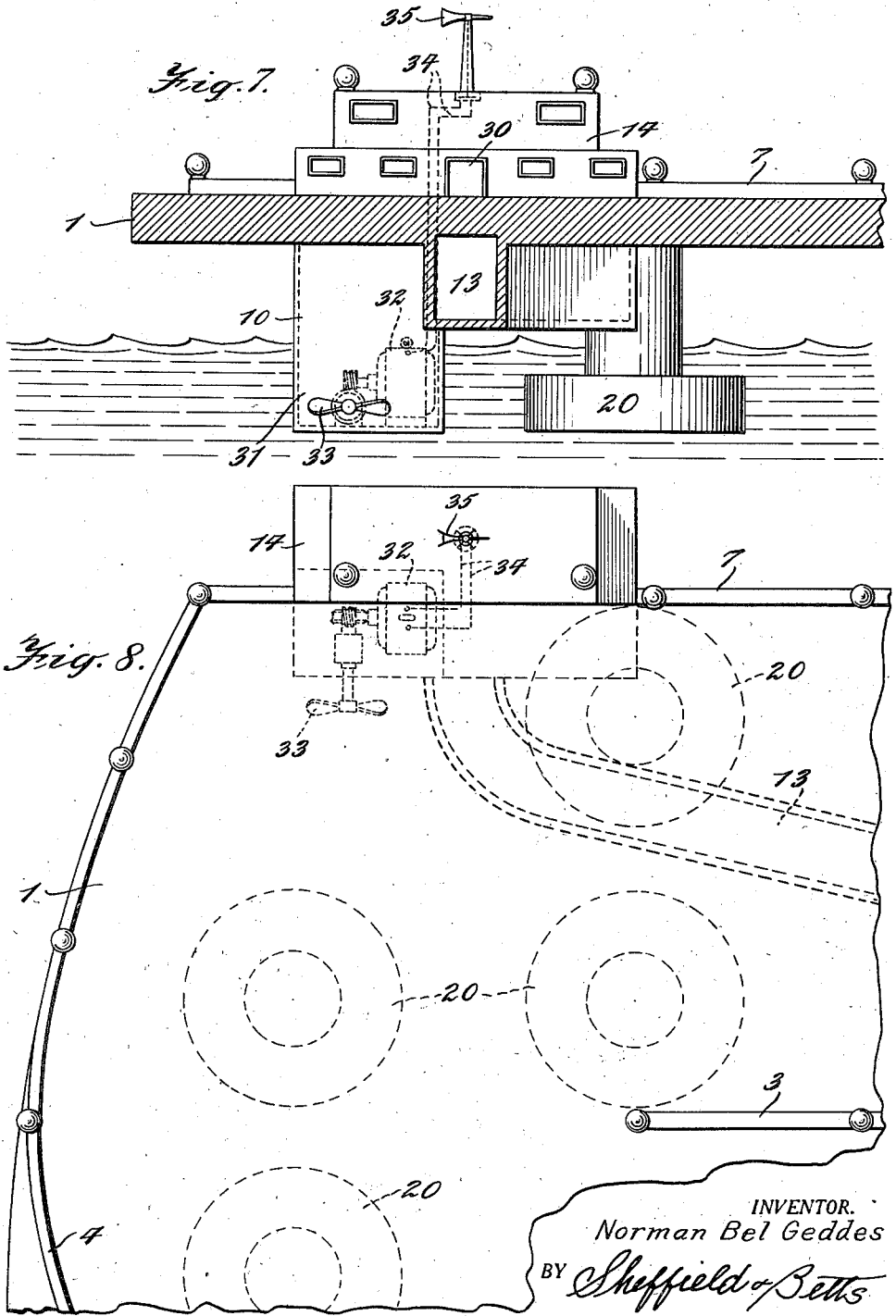

Patented Jan. 5, 1937

2,066,776

UNITED STATES PATENT OFFICE 2,066,776

ROTARY PORT FOR AIRCRAFT

Norman Bel Geddes, New York, N. Y.

Application June 5, 1934, Serial No. 729,057

8 Claims. (Cl. 244—114)

This invention relates to a rotary platform or surface of a comparatively large area for landing and launching purposes, so that aircraft, such as airplanes and other similar vehicles, may land and take off from such platforms located in convenient positions near traffic centers, such as large cities, in a manner most convenient and safe to both the aircraft and the passengers therein, depending upon the direction of the prevailing winds. Briefly stated, my invention comprises a platform which is pivoted or rotary and which preferably floats on or is supported above the surface of a body of water such as a harbor, bay or inlet that is conveniently near some center of population.

It is of course well known among aeronautical engineers and pilots that it is always preferable if not essential to cause an airplane to land or take off in a direction which is facing the direction from which the local wind is blowing and, therefore, any airport or landing field should be so positioned that the taking-off and landing, as well as the so-called "taxiing" of the airplane, may be accomplished in the least space and without undue danger to the plane or to its passengers.

Such being the case I have designed a rotary airport or landing and taking-off platform which always assumes such a position that the landing and taking-off lanes on the airport are substantially coincident with the direction of the prevailing wind at the time of the use of the airport.

Furthermore, it is a feature of my invention to cause the airport automatically to assume the proper position to accommodate the prevailing winds and also to provide convenient means for the egress and ingress of passengers from and to the stopping and starting points when the aircraft is discharging and receiving its passengers. For this purpose the central or pivotal point of the rotatable airport or platform is hollow and is preferably connected with suitable passages beneath the platform through which the passengers may walk or otherwise travel to a suitable point on the adjacent shore.

Another feature of my invention is to provide suitable supporting devices for the platform so that the platform may also be located at a proper distance above the surface of the water and at the same time be unaffected by disturbances of the water owing to waves or wind. Furthermore, the arrangement is preferably such that the platform may accommodate itself to different levels of the water surface occasioned by various stages of the tidal water in which the airport may be situated.

For a detailed description of my invention, reference may be had to the following specification and to the accompanying drawings forming a part thereof, in which:

Fig. 1 is a plan view of my preferred form of rotary airport;

Fig. 2 is a vertical sectional view of the device as shown in Fig. 1 and taken substantially on the line 2—2 and the central longitudinal line thereof;

Fig. 3 is a vertical transverse sectional view of the central part of the apparatus as shown in Fig. 1, on an enlarged scale; the port being shown as rotated 90°;

Fig. 4 is a horizontal sectional view of the apparatus as shown in Fig. 3, taken substantially on the line 4—4 of Fig. 3.

Fig. 7 is a longitudinal sectional view of the left hand end of the airport shown in Fig. 1 and taken substantially on the line 7—7 of that figure;

Fig. 8 is a plan view of that part of the airport or platform illustrated in Fig. 7.

Figure 5:
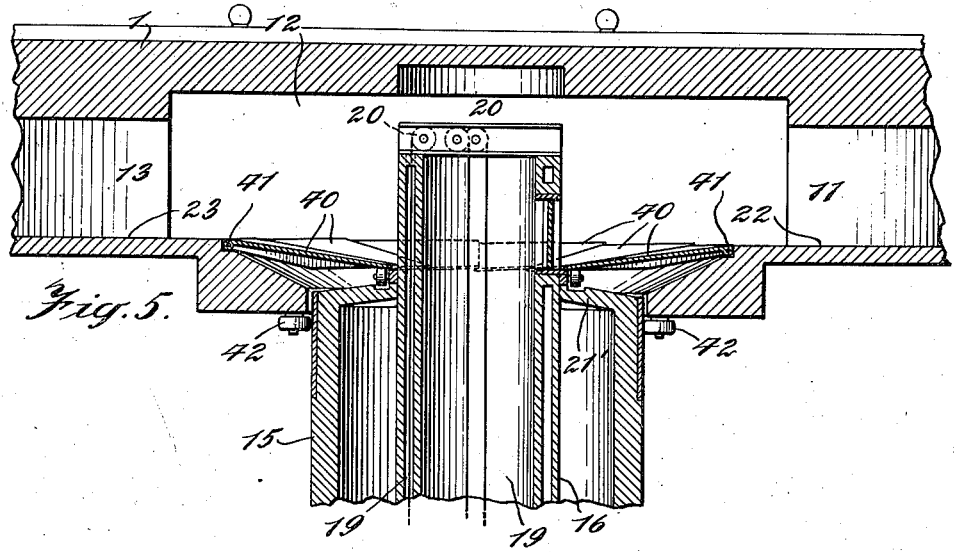
Fig. 5 is a sectional view of the central portion of the apparatus similar to Fig. 3 but showing a modified form of connection between the stationary and movable parts of the airport.

Referring to the drawings the numeral 1 indicates a platform made of suitable material such as wood or any preferred construction, such as structural steel reinforced with concrete. It is substantially rectangular in shape and sufficiently long to provide lanes for the landing and taking off of airplanes and similar aircraft. The platform may be provided with rounded ends as indicated in Fig. 1, although such a shape is not essential. The surface of the platform is provided with a plurality of low dividing ribs or curbs as indicated at 2 and 3. These divide the surface of the platform into three lanes, the lower lane in Fig. 1 being for the landing of aircraft, the central lane being for the taxiing of the aircraft to the starting position and the upper lane being for the taking off of airplanes and to provide sufficient space for longitudinal travel before leaving the surface of the platform. These curbs or dividing ribs are preferably curved at the ends as indicated at 4 and 5 so as more clearly to define the respective lanes. Additional ribs or curbs are also provided on the outer margins of the platform as indicated at 6 and 7. For use in the night time it is preferable that the curbs be provided with suitable electric lights or other lamps at necessary intervals to more brightly light the curbs and to define the widths of the lanes with greater clearness.

Figure 6:
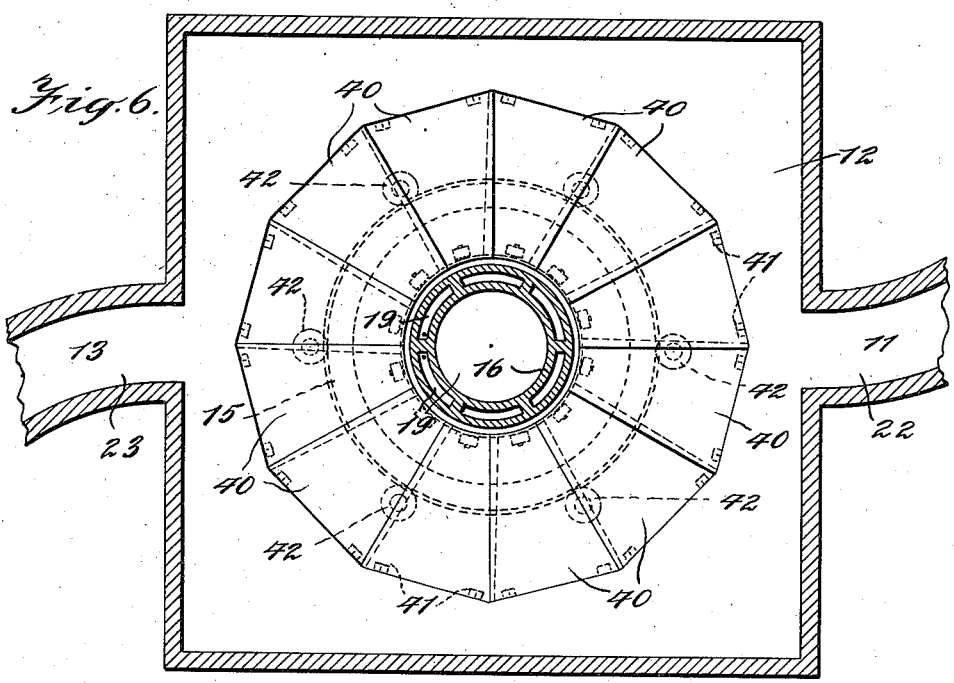
Fig. 6 is a plan view thereof similar to Fig. 4.

In order that the passengers who land from the airplanes, as illustrated for example by the numeral 8, may be received in a suitable waitingroom and then make their way to the shore, a small enclosure in the nature of a house or building is provided as shown at 9 similar to those shown in Figs. 1, 5 and 6. This small building is preferably built outside of the outer edge of the platform so as not to obstruct its clear field. It is provided with a portion which extends below the surface of the platform as indicated in Figs. 2 and 7 by the numeral 10. The lower level of this building is reached by any suitable stairway or, if preferred, by an elevator, a stairway being shown in Fig. 2. Extending, preferably, beneath the main platform 1 is a passageway 11 which forms a part thereof and is of suitable size in cross-section to allow persons to walk easily therethrough. This passage is preferably located above the water line as is indicated in Fig. 2, and extends toward the central point of the platform and communicates with a central room or lobby indicated by the numeral 12. This lobby also is connected with a second passageway 13 which leads to a similar building or house 14 which is provided for the passengers who wish to board aircraft at that point. The central room or lobby 12 surrounds a central cylindrical fixed pivot or well as indicated at 15. This pivot is preferably made of reinforced concrete or any other suitable material available for such constructional purposes. Its main features are illustrated in greater detail in Fig. 3.

The tubular portion of this pivot 15 is provided with a suitable bottom 15' resting upon a firm foundation or footing. The central portion of the hollow pivot 15 contains an elevator shaft 16 constructed in any preferred manner depending upon the preference of the engineer or designer and is adapted to contain and guide a suitable elevator 17. This is operated preferably by an electrically driven drum 18 at the bottom of the shaft, the drum being rotated by the usual electric motors, controls and similar devices employed in elevator construction. The ropes or cables from the drum 18 pass through suitable passages 19 at the side of the elevator shaft and over the usual pulleys 19' at the top of the shaft; the cables then pass downward and are attached to the elevator car 17 as indicated.

The above mentioned platform 1 is adapted to rise and fall with the changes in the tide in the harbor or other places where tides exist. In order to support the platform above the surface of the water and yet cause it to be practically independent of the waves on the surface of the water it is preferably supported by columns upon ballasted buoyancy tanks as indicated at 20. These tanks being located below that portion of the water disturbed by surface waves keep the platform or deck substantially level under various weather conditions since the waves may pass easily around the columns and below the bottom of the deck structure.

In view of the fact that the whole platform or deck rises and falls with the changes in tide it is necessary to provide variable approaches between the fixed cylindrical well 15 and the portion of the platform or deck containing the room or lobby 12. This is accomplished in the following manner:

As shown in more detail in Figs. 3 and 4, the upper end of the pivot well 15 is provided with an annular floor portion or surface 21 which surrounds the elevator shaft 16. The pivot well is fixed in position since it rests on the bottom of the local harbor or similar body of water. The platform 1 containing the room or lobby 12 moves upward and downward in accordance with the changes in the tide and therefore the floors 22 and 23 of the passages 11 and 13 are also constantly located at different levels relative to the floor of the room 12. In order that the passengers may easily walk from the floors 23 to the top 21 of the well 15 and thereafter pass through the door 24 to the elevator 17 when in receiving position, an annular series of steps are provided as indicated at 25. These steps consist of the annular surfaces $a, b, c, d, e, f, g,$ and $h$.

These steps constitute gangways and provide for changes between flood and ebb or neap tides of approximately four feet and there being eight steps in addition to the floor 23 of the room 12 each riser on the steps is approximately 6" high. By making the risers 8" the range of the differences in tide levels could be increased to 64" or, obviously, the number of steps can also be increased.

The surface of the annular step $a$ is therefore substantially four feet below the surface of the annular step $h$. The step $b$ is 6" higher than the step $a$, $c$ is 6" higher than $b$, $d$ is 6" higher than $c$, $e$ is 12" higher than $d$, $f$ is 6" higher than $e$, $g$ is 6" higher than $f$, and $h$ is 6" higher than $g$. The annular steps are limited in arcuate direction by the edges indicated by the radial lines between the steps in Fig. 4. It will thus be seen that at any tide level one of the annular series of steps will be adjacent the same level as the floor of the room 12 or of the passages 11 and 13. Thus the passengers going from or to the aircraft may pass into and out of the elevator by descending or ascending the requisite number of steps corresponding to the level at which the rotary airport or platform rests, as determined by the existing stage of the tide. In other words, at high tide the lowest annular step $a$ will be substantially level with the top 21 of the well 15 and at low tide the top 21 will be at substantially the level of the highest step $h$.

Adjacent the bottom of the elevator shaft 16, a door 26 is provided which communicates with an underground or submerged passage 27 constructed of any suitable material so as to form a tunnel which passes beneath the shore line to a point below a small house 28 located on land adjacent the shore line. This house serves as an entrance to the tunnel and obviously may be provided with an elevator, stairs or any other preferred form of apparatus for allowing the exit and entrance of passengers to the tunnel 27.

In the modification shown in Figs. 5 and 6 the numeral 15 represents the cylindrical well or pivot of the platform and the numeral 16 indicates the elevator shaft located therein. The upper portion of the elevator shaft 16 is provided with an annular flange 21', which is preferably provided with antifriction rollers as indicated in Fig. 5. The floor 22 of the passage 11 and the floor 23 of the passage 13 are level with the floor of the room 12. The circular opening in the floor of the room 12 is provided with gangways in the form of tapering plates or sectorial pieces 40 hinged as at 41 and extending to within a few inches of the elevator shaft 16. These sectorial plates slightly over-lap each other as indicated by dotted lines in Fig. 6 so that no appreciable gap may exist between them when the inner ends of the sectorial plates are in their highest or lowest positions, the latter being indicated in Fig. 5. These plates form an annular ramp up or down which passengers may walk in order to reach the door 24 leading into the elevator shaft 16. The amount of incline of the ramp when the tide is at its highest point or flood tide and when the platform is in its lowest position at low tide may be such as to allow the passengers to pass to the different relative levels of the door 24 and the amount of incline in such positions may be made to be that most agreeable to persons using the ramp. For example, assuming that the plates 40 are 25 feet long and the flange 21' on the shaft 16 is 2 feet below the floors 22 and 23 then the pitch of the sectorial pieces 40 would be 2 feet in 25 feet or about 1 foot in 12½, which is not objectionable when passing up and down the same. At low tide this incline would be in the opposite direction but in an equal amount upward toward the stationary elevator shaft 16.

This form of the apparatus for permitting the egress and ingress of passengers from the elevator has the advantage that the elevator may be easily reached from all points without passing around the edge of the ramp as is necessary in the use of the steps illustrated in Figs. 3 and 4, while at the same time a considerable range of tidal positions is accommodated without necessarily changing the number and shapes of the steps shown in said figures.

Antifriction rolls or wheels 42 are shown between the fixed pivot 15 and the lower part of the platform and they are preferably located below the margin of the floor of the room 12. Obviously such antifriction devices are well-known and the particular form thereof that is used will depend upon the individual preferences of the designing engineer.

The landing and taking-off platform or airport being rotary about the axis of the hollow pivot 15 and it being necessary to maintain the longitudinal central line of the platform coincident with the direction of the wind it is necessary to rotate the platform to accommodate the various changes in the direction of the wind. This is preferably accomplished automatically and positively by mechanical or electrical devices which will now be referred to.

The sectional view shown in Fig. 7 is taken adjacent the small building 14 from which the passengers emerge to embark on the aircraft and which is consequently provided with a door as indicated at 30. A portion of the building 14 is extended below the surface of the water as indicated at 31. This extension is adapted to contain a suitable motor 32 for actuating a propeller 33 similar to those for driving steam vessels or motor ships. The controlling wires or leads for the motor 32 are indicated at 34 and the current through them is established or interrupted by any suitable apparatus in the form of servo-motors, relays or other devices well-known to electrical engineers. These devices are controlled by the position of a wind indicator 35 preferably situated on the top of the house or small building 14. This indicator or weather vane is connected with a controlling apparatus within the house 14 in such a manner that when the vane does not lie parallel with the longitudinal central line of the platform the current through the motor 32 will be established to revolve the rotor of the motor and consequently the propeller 33 in one direction or the other to place the ends of the platform in the correct position about the cylindrical pivot 15. A propelling device is preferably provided at each end of the platform so that equal opposite forces in either direction may be produced at such points, that is, a propeller 36 is located in the water beneath the building 9 and the propeller 33 is located in the water beneath the building 14. These propellers are both preferably controlled automatically as above pointed out, the necessary electric current if used being supplied through cables from the mainland which cables may conveniently pass through the tunnel 27 to the cylindrical pivot 15 and thence through the passages 11 and 13 or otherwise as may be preferred by the designing engineer.

From the above descriptions it will be appreciated that primarily the platform or rotary airport will be caused to lie with its longitudinal central line practically coincident with the direction of the prevailing wind and therefore an aircraft in landing may always fly into the wind and may take off in the same direction, i. e. against the prevailing wind. It will also be observed that regardless of what position the platform or rotary airport may assume relative to the direction of the wind the egress and ingress of the passengers from the receiving and discharging waiting-rooms in the respective buildings will not be interfered with in any way. Such construction may also be provided that the platform will comprise several detachable sections that are appropriately floated or supported independently of each other to permit reconstruction or repair of parts of the platform without disabling the whole structure, as will be appreciated by one skilled in the art.

Having thus described these embodiments of my invention I do not wish to be understood to be limited to the details of form or arrangement of parts herein set forth, except insofar as may be consistent with the scope and tenor of the accompanying claims, for various changes may be made by those skilled in the art without departing from the advantages incident to the above described construction.

What I claim and desire to protect by Letters Patent is:

1. A rotary port for aircraft, comprising, a platform floated above the surface of a body of water of varying depth and constituting landing and taking-off stages in the flight of aircraft, a fixed hollow pivot therefor extending to the bottom of said body of water and providing for vertical movement of said platform, means for rotating said platform about said pivot in accordance with the directions of the prevailing winds, passages communicating with said hollow pivot and located beneath said platform to allow the access of passengers between the discharging and loading points on said platform and said hollow pivot, and a submerged passage leading from the latter to a fixed point beyond the area covered by said platform.

2. A rotary port for aircraft, comprising a platform floated above a body of water of varying depth, a central hollow fixed pivot providing for vertical movement of said platform, means for rotating said platform about said pivot, passages leading from the opposite ends of said platform and located below the surface of the same and having outlets communicating with said hollow pivot, approach members having portions of varying heights for permitting the passage of persons from said passages to the interior of said pivot when said passages are at varying levels, means within said pivot for accomplishing the descent and ascent of passengers, and a submerged outlet passage communicating with the interior of said hollow pivot adjacent its lower end.

3. A rotary port for aircraft, comprising, a platform floated above a body of tidal water, a fixed hollow pivot for said platform about which the same may rotate and move upward and downward with changes in the level of said water, a central vertical structure within said hollow pivot and having an opening therein at a fixed level adjacent its top, a floor surrounding said structure, and approach members having portions of varying heights for permitting convenient movement of passengers from said platform to said floor in accordance with various changes in the surface levels of said water and the positions of said platform above the same.

4. A rotary port for aircraft, comprising, a platform floated above a body of tidal water, a fixed hollow pivot for said platform about which the same may rotate and move upward and downward with changes in the surface level of said water, a central hollow shaft within said hollow pivot and having a lateral opening therein at a fixed level, a fixed member surrounding the same, said platform having passages carried beneath the same and terminating adjacent said fixed pivot, and approach members having portions of varying heights accessible from said passages for permitting access to said fixed member and shaft in accordance with the various changes in the surface levels of said water and the positions of said platform above the same.

5. A rotary port for aircraft, comprising, a platform floated above a body of tidal water, a fixed hollow pivot for said platform about which the same may rotate and move upward and downward with changes in the surface level of said water, a central hollow portion within said hollow pivot and having a central passage with a lateral opening therein adjacent its top, passages carried by said platform and terminating adjacent said hollow pivot, members having surfaces of varying heights extending between said passages and said opening for permitting entrance to and exit from said shaft in accordance with the various changes in the surface levels of said water and the positions of said platform above the same.

6. A rotary port for aircraft, comprising, a platform rotatably floated above a body of water, a central fixed hollow pivot member providing for vertical movement of said platform, passages beneath said platform and leading toward said hollow pivot, a central passage within said hollow pivot and having an opening therein at a fixed level, a fixed member surrounding said pivot, members forming gangways having portions of varying heights and accessible from said passages for permitting ascent or descent to said fixed member in accordance with the various levels of said passages, and a submerged outlet passage leading from a point adjacent the bottom of said shaft to a fixed point on shore.

7. A rotary port for aircraft, comprising a platform rotatably floated above a body of water, a central fixed hollow pivot member providing for vertical movement of said platform, passages leading from opposite ends of said platform and terminating adjacent said pivot member, a power-operated carrier within said pivot member for affording ascent and descent of passengers therein, members forming gangways having portions of varying heights for permitting access of said passengers from said passages to said central carrier in accordance with the changing levels of said passages, and a subterranean passage leading from a point adjacent the bottom of said hollow member to a fixed point on shore.

8. A rotary port for aircraft, comprising, a platform rotatably floated above a body of water of varying depth, a central fixed hollow pivot providing for vertical movement of said platform, passages leading from opposite ends of said platform and located beneath the same and terminating adjacent the said hollow pivot, a central hollow shaft within the latter and having an opening therein at a fixed level, a fixed member surrounding said shaft, members having portions thereof at different levels and connecting said passages with said fixed member, to provide gangways from said passages to said member in accordance with the changing levels of the floors of said passages, and a subterranean passage leading from a point adjacent the bottom of said shaft to a fixed point on shore.

NORMAN BEL GEDDES.